United States Patent [19]

Gronau et al.

[11] Patent Number: 4,676,532

[45] Date of Patent: Jun. 30, 1987

[54] T-SHAPED RUBBER HOSE

[75] Inventors: Joachim Gronau, Winsen/L; Klaus-Jurgen Heins, Hamburg, both of Fed. Rep. of Germany

[73] Assignee: Phoenix Aktiengesellschaft, Hamburg-Harburg, Fed. Rep. of Germany

[21] Appl. No.: 657,725

[22] Filed: Oct. 4, 1984

[30] Foreign Application Priority Data

Oct. 11, 1983 [DE] Fed. Rep. of Germany ....... 3336940

[51] Int. Cl.[4] .............................................. F16L 41/00
[52] U.S. Cl. .................................. 285/156; 285/423; 285/915
[58] Field of Search ................. 285/156, 55, 423, 398, 285/915, 371

[56] References Cited

U.S. PATENT DOCUMENTS

| | | | |
|---|---|---|---|
| 1,762,766 | 6/1930 | DeGaray | 285/398 X |
| 2,878,038 | 3/1959 | Noland | 285/156 X |
| 3,540,223 | 11/1970 | Ebbe | 285/156 X |
| 3,561,795 | 2/1971 | Becher | 285/55 |
| 3,612,580 | 10/1971 | Jones | 285/371 X |
| 3,765,979 | 10/1973 | Thomas | 285/156 X |
| 3,975,039 | 8/1976 | Penneck et al. | 285/156 |
| 4,231,596 | 11/1980 | Ridenour | 285/398 X |
| 4,257,630 | 3/1981 | Bartell et al. | 285/423 X |
| 4,457,542 | 7/1984 | Shaefer et al. | 285/156 X |
| 4,504,086 | 3/1985 | Carrow | 285/156 |

FOREIGN PATENT DOCUMENTS

| | | |
|---|---|---|
| 164658 | 1/1954 | Australia ............................ 285/423 |
| 8108182 | 3/1981 | Fed. Rep. of Germany . |
| 2532507 | 4/1983 | Fed. Rep. of Germany . |
| 3151015 | 7/1983 | Fed. Rep. of Germany . |

*Primary Examiner*—Thomas F. Callaghan
*Attorney, Agent, or Firm*—Collard, Roe & Galgano

[57] ABSTRACT

The invention relates to a T-shaped hose composed of three branches made of rubber or similar material with a fabric lining. The three branches are arranged in the form of a "T", but are spaced apart from one another so as to define an uninterrupted, circumferentially-extending gap therebetween. The gap is then closed by a separate rubber compound. A non-adhering T-shaped tubular support made of rigid and thermally stable material is arranged in the interior of the hose within the T-zone, while the exterior T-zone of the hose is covered by a rubber layer.

14 Claims, 6 Drawing Figures

T-SHAPED RUBBER HOSE

BACKGROUND OF THE INVENTION

The invention relates to a T-shaped hose composed of hose segments made of rubber or a similar rubber-like material with fabric linings.

The use of T-shaped hoses in motor vehicles, washing machines and other equipment is increasing. Such hoses are made of rubber grades or qualities which must meet the requirements with respect to the media conveyed through such hoses, and the thermal stresses to which it will be subjected. These hoses are provided with reinforcing linings, preferably fabrics based on synthetic fibers. It is important that such hoses can readily absorb the pressures to which such hoses are subjected. With T-shaped hoses, the zone of junction within the area of the "T" is a weak point. Various "state of the art" manufacturing methods are known which can be carried out in a smooth and safe manner for producing T-shaped hoses capable of meeting the foregoing requirements.

However, in view of the trend to simplify their manufacture and to limit or reduce the considerable amount of manual labor, problems are encountered with the current designs and associated manufacturing processes, which problems are reflected by an increased number of defective products. Owing to the fact that their manufacture is carried out in practical industrial life under very rough conditions, the manual work cannot be expected to meet highly exacting requirements. Furthermore, it is not possible to accomplish at the same time the simultaneous execution of a number of process steps, high production rates and the exercise of care in such work.

SUMMARY OF THE INVENTION

It is therefore the object of the present invention to provide a T-shaped hose which permits a particularly safe and rapid manufacturing process while, at the same time, substantially reducing the occurrence of defective products.

According to the present invention, this object is achieved by arranging three hose branches in the form of a "T", so as to leave an uninterrupted narrow gap therebetween. This gap is sealed by a separate rubber compound and a non-adhering T-shaped tubular support made of a rigid and thermally stable material is arranged in the interior of the hose branches within the zone of the "T". By this arrangement, the hose can always be displaced somewhat on the edges of the T-shaped tubular support if the hose is subjected to any bending in these areas. The T-shaped zone of the hose may be covered on the outside by an additional rubber layer or coating.

Such a hose design or structure eliminates the manufacture of defective products even if the manufacturing process is carried out at a high speed and under difficult operating conditions. With such a T-shaped hose, the three branches of the hose are pushed onto the T-shaped piece made of rigid and thermally stable material. An uninterrupted narrow gap is formed between the end faces of the branches, which gap is sealed with a rubber compound. The rubber compound is applied in a corresponding mold. The T-shaped piece has the function of an inner support. The rubber compound filling the circumferential gaps seals the end faces of the hose branches and thus the fabric projecting from the branches. By slightly increasing the filling pressure of the—still unvulcanized—rubber compound, which is achieved by automatic pressure control, it is possible to also cover the interior sections of the branches with rubber.

For the rubber compound used to seal the circumferential gaps between the ends of the hose, it is important that one starts with a compound that matches the rubber of which the already-vulcanized hose member is made of, e.g., if the hose parts are made of polychlorobutadiene, then one starts with a rubber compound with polychlorobutadiene. Following the state of the art, one would, preferably, start from ethylene-propylene terpolymer (commonly known as "EPDM"). EPDM is particularly preferred because it is relatively inexpensive and has a high resistance to external factors of all kinds. The high resistivity of EPDM is due to the highly-saturated character of the rubber.

It is particularly desirable that the rubber compound used to seal the gaps have a low viscosity in the unvulcanized state. Increased flowability may, e.g , be attained in the rubber compound selected by the addition of 20%–40% by weight of a softener having a paraffin oil base. The rubber compound should then preferably undergo a rapid vulcanization process, e.g., within 12–18 minutes at 170° C. Accelerators, e.g., dithiocarbamate, thiazole, etc., may be used to achieve this rapid vulcanization. In accordance with standard procedure, the mixture is vulcanized with approximately 1%–2% by weight of sulphur. The mixture further contains 20%–40% by weight of soot and is set to a shore hardness of about 60°.

As the circumferential gap between the hose branches is being filled, an additional jacket layer may be simultaneously applied around the hose in order to stiffen the area of the T-joint.

An extremely important aspect of the T-shaped piece is that due to its non-adherence, that part of the hose beyond the edges of the T-shaped piece may be stressed under loads to about the same extent as the rest of the hose. In this manner, any risk of damage to the inner wall of the hose in the region of the edges of the T-shaped piece is reduced. If, alternatively, the T-shaped piece is rigidly adhered to the fitted hose, this part of the hose becomes particularly exposed to damage when the hose is expanded under elevated interior pressure, with resulting peaks of tension occurring in the wall of the hose.

The T-shaped piece may be made of plastic material which also exhibits dimensional stability at the vulcanization temperature. Such a plastic may be manufactured by conventional methods known to the synthetic materials industry, e.g., Polyamide 6/6, chemically defined as a polycondensate product from hexamethylenediamine and adipic acid. Also, the thermal stability may be increased by using fillers. In many cases, a T-shaped piece made of metal is useful in cases in which the thermal stresses are particularly high, due to the shape of the article and tools or dies used in the vulcanization.

The wall thickness of the T-shaped piece should be kept as low as possible in order to avoid shrinking or narrowing of the inside diameter of the hose. It is particularly important that the T-shaped piece be able to readily withstand the pressure applied when pressing in the rubber compound for sealing the joints.

Furthermore, the branches of the hose around the area of the "T" may be provided with an enlarged cross section, which assures a constant inside diameter also within the zone of the "T". In this case, the T-shaped piece should have the same inside diameter as the adjacent parts of the T-shaped hose. The T-shaped piece may be provided with annular ribs on its branches in order to achieve rigid clamping of the parts during the manufacture of the T-shaped hose.

If no additional thick rubber layer is desired for the T-shaped hoses within the zone of the "T", a rubber compound interspersed with fibers may be admitted into the joints and adjacent areas. These fibers, which are preferably contained in the rubber compound in an amount of about 20% by weight, relative to the total compound, assume the function of the reinforcing linings in the hose. Their length may be up to a few millimeters.

The rubber sheathing or coating may be also reinforced by strips of fabric having perforations permitting the rubber to pass therethrough. Such perforations or openings may be achieved, for example, by using a wide-mesh weave or by punching the strips. Also, a reinforcement may be achieved by self-adhering individual filaments bridging the gap.

In order to further reduce stress of the areas around the end zones of the preferably polyamide T-shaped piece, it is useful if the edge of the rubber layer and the end of the branches of the T-shaped piece are not aligned with each other. The edges of the T-shaped piece preferably project beyond the end of the rubber layer.

Other objects and features of the present invention will become apparent from the following detailed description considered in connection with the accompanying drawings, which disclose two embodiments of the invention. It is to be understood that the drawings are to be used for the purpose of illustration only, and not as a definition of the limits of the invention.

BRIEF DESCRIPTION OF THE DRAWINGS

In the drawings, wherein similar reference numerals denote similar elements throughout the several views.

DETAILED DESCRIPTION OF THE PREFERRED EMBODIMENTS

Figure 1:
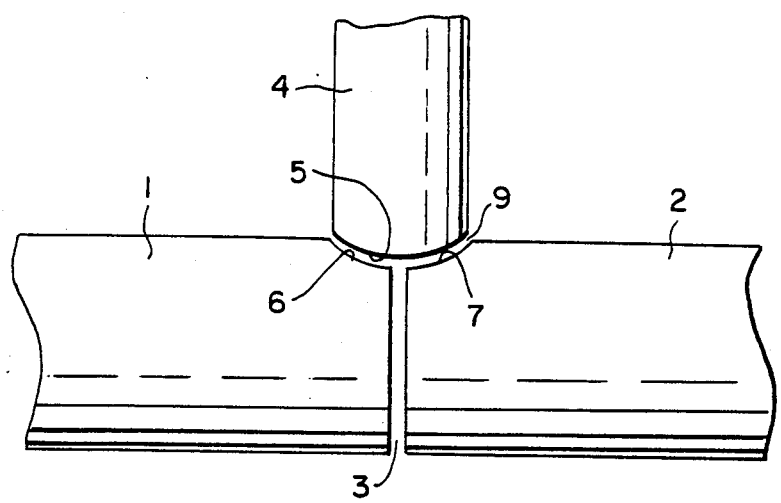
FIG. 1 is an elevational view showing how the branches of a hose embodying the present invention are arranged relative to one another.

Turning now in detail to the drawings and, in particular FIG. 1 thereof, therein illustrated is a novel T-shaped hose embodying the present invention which includes a main hose composed of two hose branches or segments 1 and 2. These segments 1 and 2 are fitted on a preferably polyamide T-shaped, tubular piece or support (not shown) in a way such that a gap 3 is left therebetween. This can be achieved in a simple, fast and safe way by means of an auxiliary abutment temporarily fitted on the T-shaped support. This gap has a width of about 5 mm which is adequate to accommodate a sufficient amount of rubber compound so that the end faces of segments 1 and 2 are fully covered. A hose branch or segment 4 is cut at its end face 5 so that it is configured to complement matching cutouts 6 and 7 of hose branches 1 and 2 so that a narrow gap 9 is provided therebetween as well. In the manufacture of the T-shaped hose, this gap is closed with rubber compound applied to it in a mold in one process step.

Figure 2:
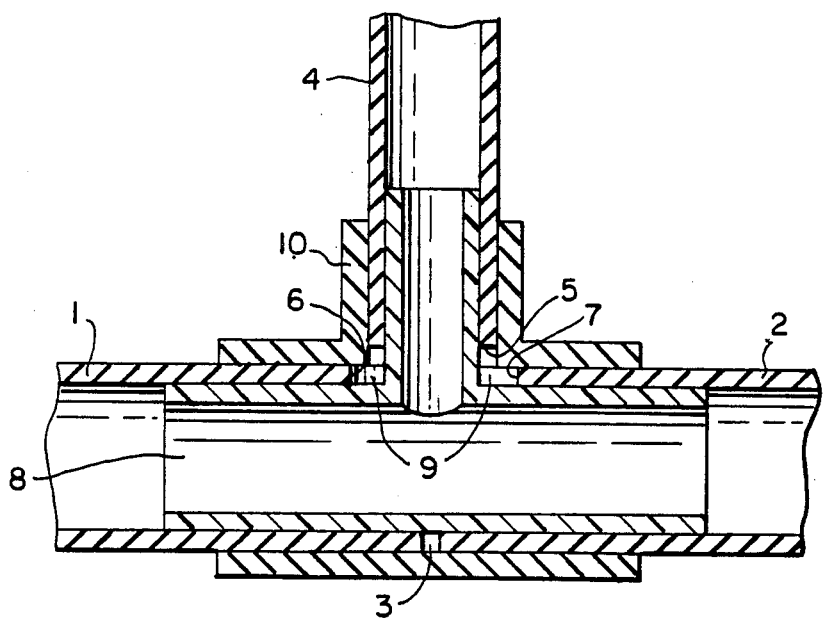
FIG. 2 is a sectional view of the completely finished hose.

FIG. 2 shows the placement of the polyamide T-shaped support 8 within the T-shaped hose consisting of the three branches 1, 2 and 4. In a mold, an additional rubber layer 10 is applied to the T-shaped hose so that it covers the entire T-shaped zone. Simultaneously, the joints shown in FIG. 1 are sealed. The branches of the hose are already fully vulcanized before they are fitted on the T-shaped support, which means they can be manufactured in a simple manner like conventional hoses or elbow hoses and then cut to suitable lengths for use in the instant hose.

Figure 3:
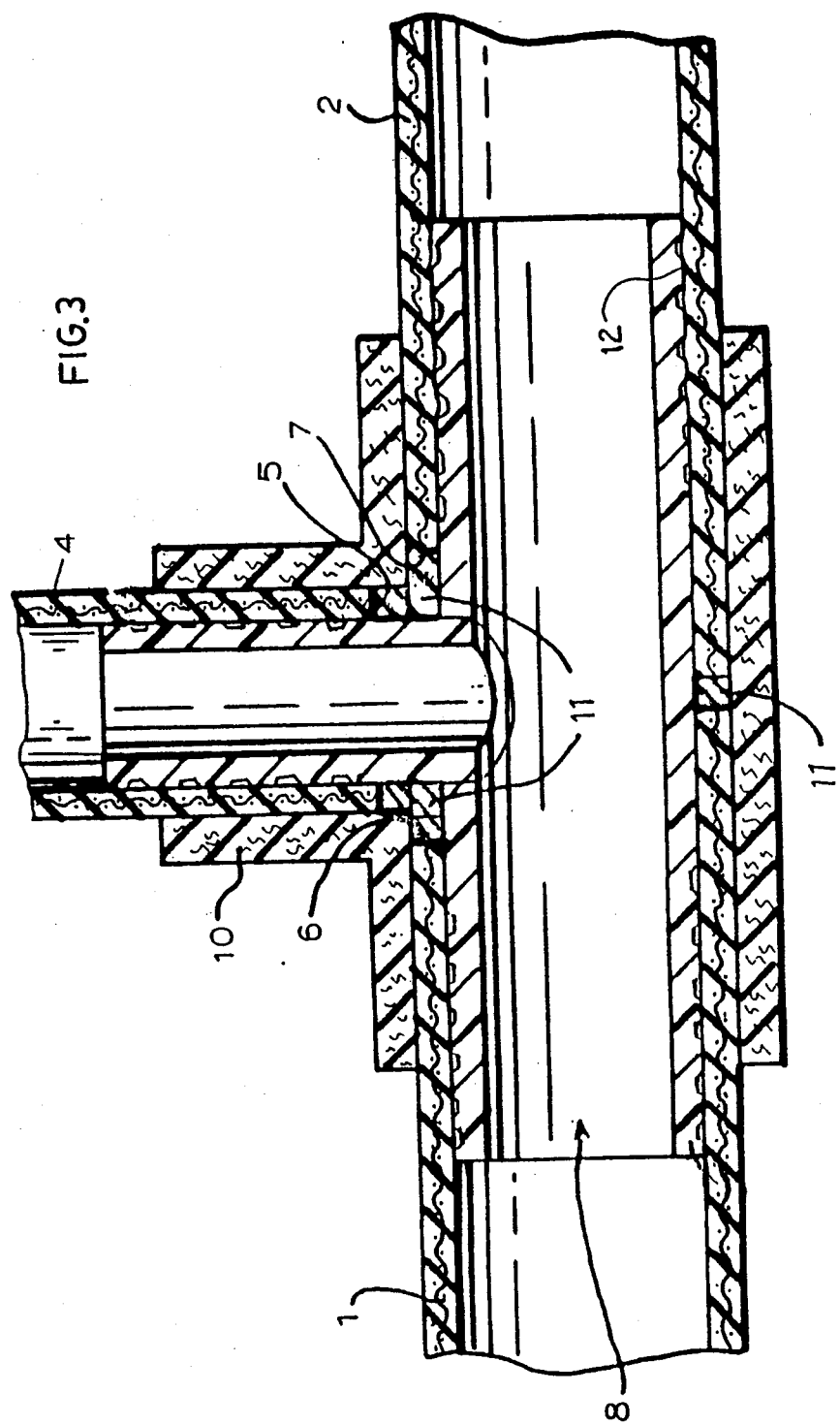
FIG. 3 is an enlarged sectional view of another embodiment of the completely finished hose.
Figure 4:
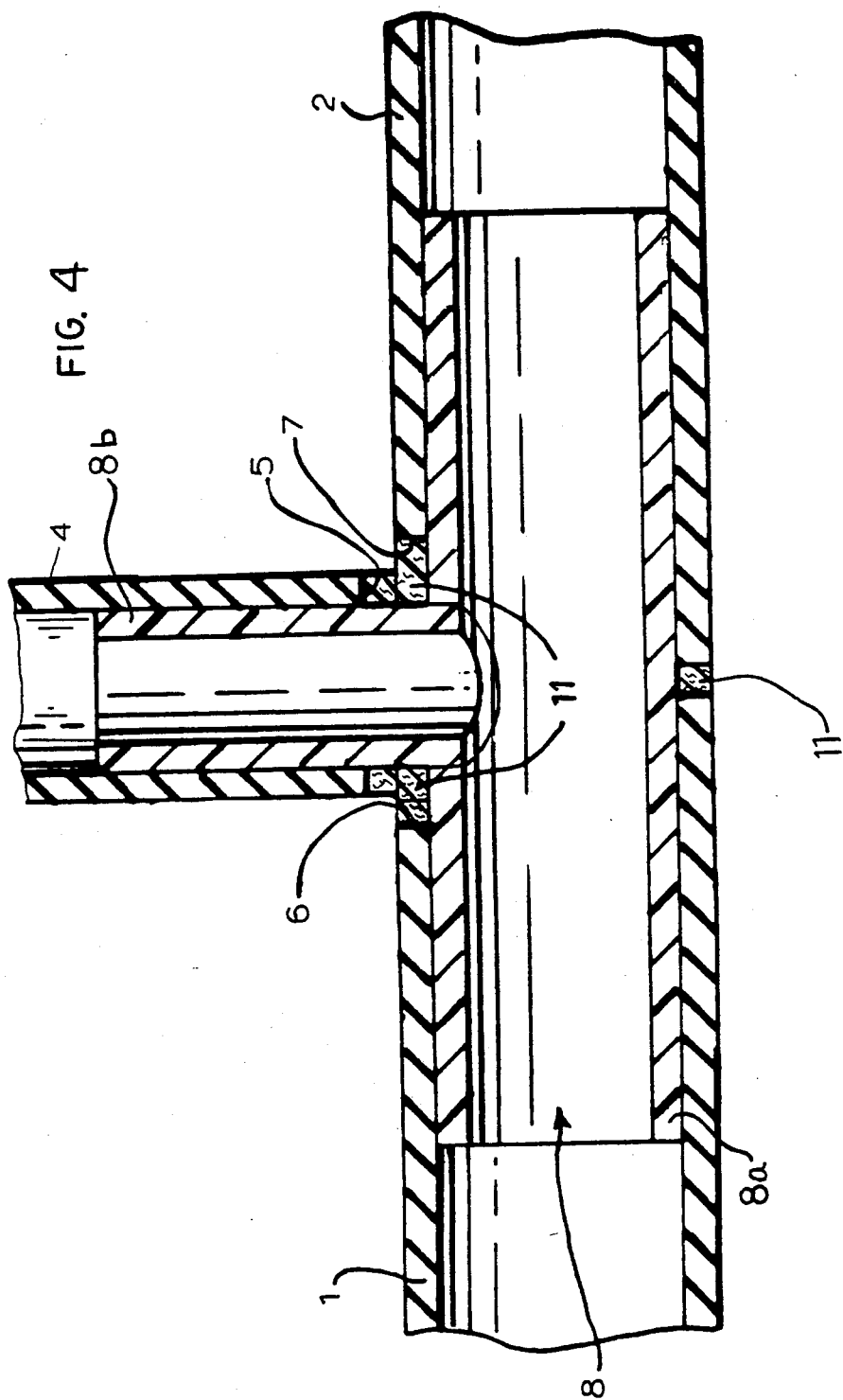
FIG. 4 is an enlarged sectional view of yet another embodiment of the completely finished hose.
Figure 5:
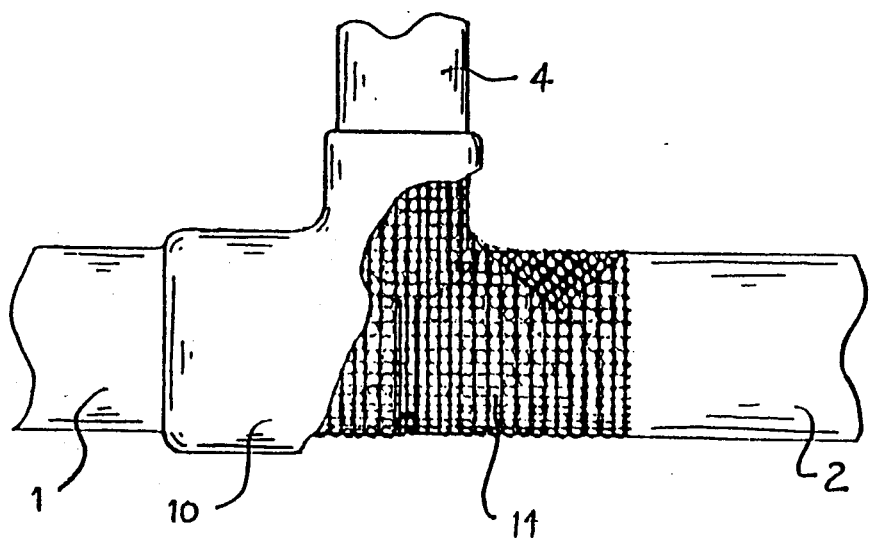
FIG. 5 is an elevational view partly cut away of still another embodiment of the completely finished hose.
Figure 6:
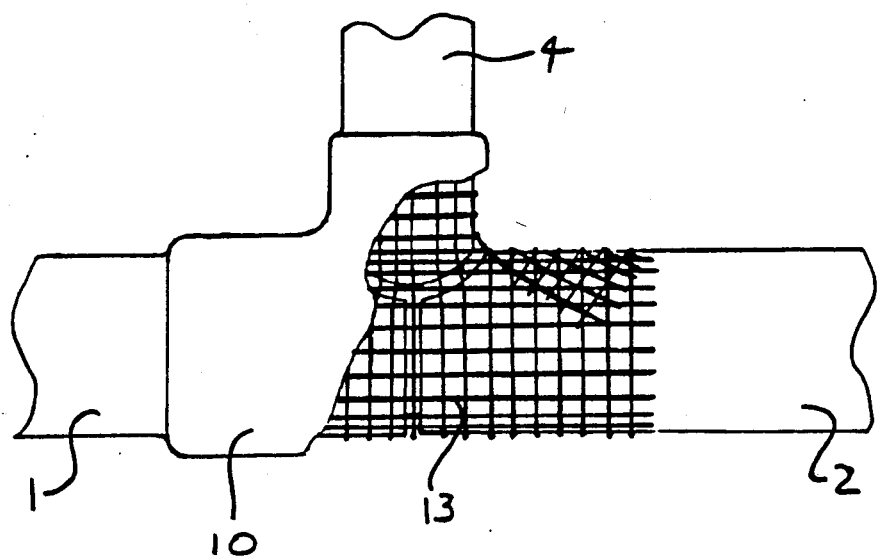
FIG. 6 is an elevational view partly cut away of yet another embodiment of the completely finished hose.

As shown i FIG. 3, which illustrates another embodiment of the T-shaped hose shown in FIG. 2, hose branches 1, 2 and 4 include fabric reinforcement and rubber layer 10 is interspersed with fibers. In addition, T-shaped support 8 is preferably provided with annular ribs 12 on any or all of its three arms, in order to achieve rigid clamping of the parts during the manufacture of the T-shaped hose. FIG. 4 illustrates an embodiment of the T-shaped rubber hose without a rubber layer wherein the gaps between the hose branches may be filled with a rubber compound 11 interspersed with fibers. A fiber-filled rubber compound is preferably used when no additional rubber sheathing or coating is to be provided around the junction zone. Support 8 may also be comprised of segments 8A and 8B, which are disengageably fitted together. A show in FIG. 5, the T-shaped hose of FIG. 2 may additionally include fabric strips 14 traversing the narrow continuous gaps between the three hose branches. The fabric strips 14 have hole-like openings which permit the rubber compound used to close the gap to pass through the fabric strips. In an alternative embodiment, the T-shaped hose of FIG. 2 may include a mesh work of filaments 13 bridging gaps 3 and 9 between the three hose branches 1, 2, and 4, as shown in FIG. 6.

While only several embodiments of the invention have been shown and/or described, it will be obvious that many changes and modifications may be made thereunto, without departing from the spirit and scope of the invention.

What is claimed is:

1. A T-shaped hose comprising:
   three fabric reinforced hose branches made of pre-vulcanized rubber or a rubber-like material arranged in the form of a "T" and separated from one another by a relatively narrow continuous gap;
   a separate vulcanized rubber compound sealing the gap and joining the hose branches; and
   a T-shaped tubular support made of a rigid and heat resistant material arranged within the interior of said hose branches within the zone of the "T", said tubular support being made of a material which is non-adherable with said hose branches and said rubber sealing compound.

2. The T-shaped hose as defined in claim 1, wherein said T-shaped tubular support is made of plastic material which maintains its dimensional stability at vulcanization temperatures.

3. The T-shaped hose as defined in claim 2, wherein said T-shaped tubular support is composed of thermal stability-enhancing fillers.

4. The T-shaped hose as defined in claim 1, wherein said T-shaped tubular support is made of metal.

5. The T-shaped hose as defined in claim 1, wherein said three hose branches have an enlarged interior cross section within the zone of the "T" so that the T-shaped tubular support has the same inside diameter as the adjacent portions of said hose branches.

6. The T-shaped hose as defined in claim 1, wherein the T-shaped tubular support has branches that are provided with annular ribs.

7. The T-shaped hose as defined in claim 1, further comprising fabric strips, transversing said gap between said three hose branches, having hole-like openings which permits said rubber compound to pass through said strips.

8. The T-shaped hose as defined in claim 1, further comprising filaments that are used to bridge said gap between said three hose branches.

9. The T-shaped hose as defined in claim 9, wherein said filaments are provided with an adhesion-imparting coating.

10. The T-shaped hose as defined in claim 1, wherein said T-shaped tubular support comprises a plurality of segments disengageably fitted together.

11. The T-shaped hose as defined in claim 1 further comprising a fabric reinforced rubber layer covering the outside of the T-shaped zone of the hose.

12. The T-shaped hose as defined in claim 1, wherein said rubber compound sealing said gap is interspersed with fibers.

13. The T-shaped hose as defined in claim 11, wherein said rubber layer covering said T-shaped zone is interspersed with fibers.

14. The T-shaped hose as defined in claim 11, wherein said T-shaped tubular support has branches which project beyond the edges of said rubber layer so as to reduce stress to the areas around said T-shaped tubular support.

* * * * *